Oct. 7, 1930.    E. J. BUDLONG    1,777,959
METHOD OF MANUFACTURING PISTON RINGS
Filed June 27, 1929
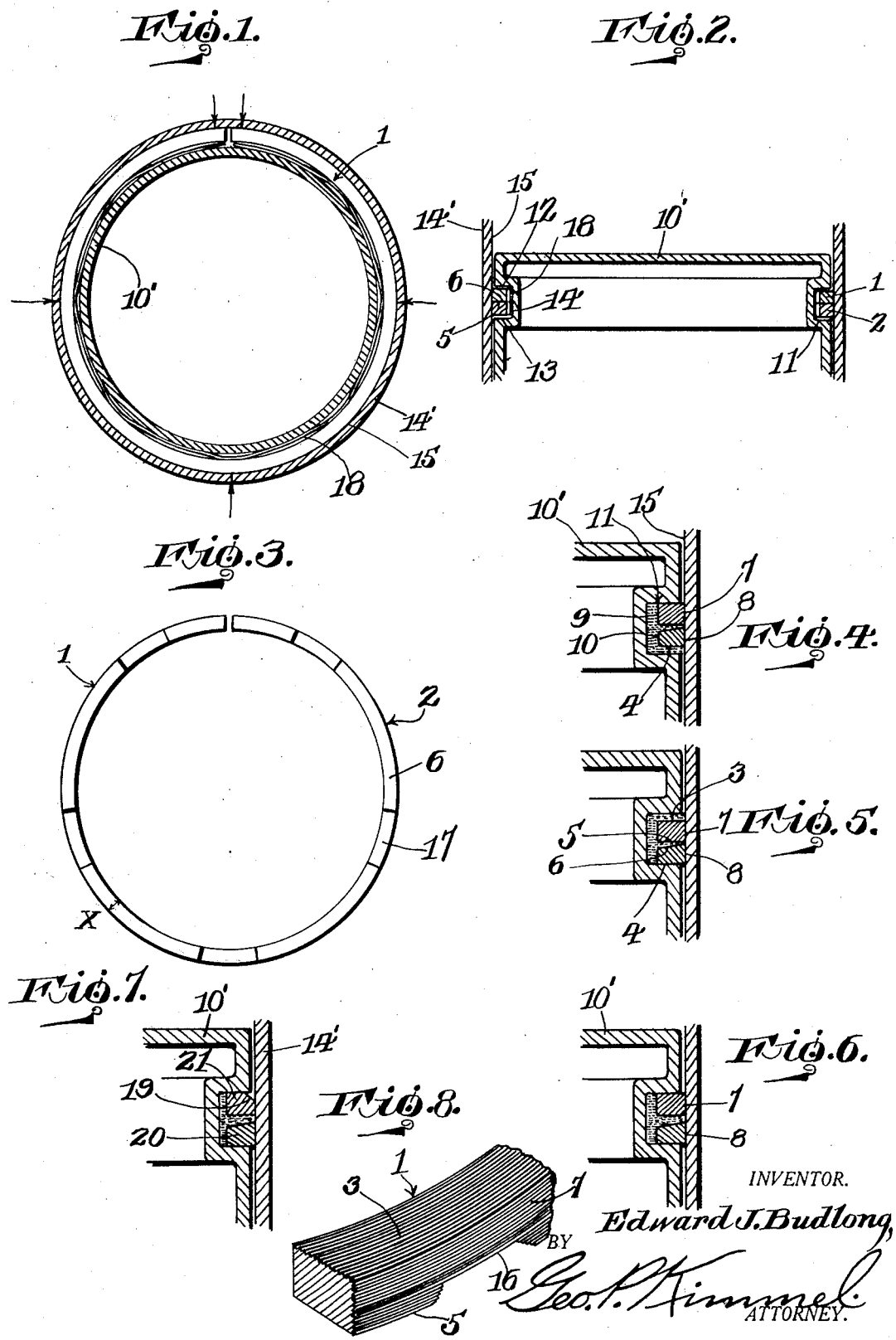
INVENTOR.
Edward J. Budlong,
BY Geo. P. Kimmel
ATTORNEY.

Patented Oct. 7, 1930

1,777,959

UNITED STATES PATENT OFFICE

EDWARD J. BUDLONG, OF HANFORD, CALIFORNIA, ASSIGNOR TO BUDLONG & FUNCHESS MOTOR PRODUCTS CO., OF HANFORD, CALIFORNIA

METHOD OF MANUFACTURING PISTON RINGS

Application filed June 27, 1929. Serial No. 374,249.

This invention relates to a method of manufacturing piston rings, and has for its object to provide, in a manner as hereinafter set forth, a sectional ring of the class referred to having its outer edge, leading face and follower face so formed to obtain a quick and accurate seating with respect to a cylinder wall and the forward and rear walls of a piston groove and whereby the seating will be had more quickly and more accurately than that obtained by the forms of pistons rings now generally used.

A further object of the invention is to provide, in a manner as hereinafter set forth, an improved construction of sectional, loose fitting piston ring to provide for a check valve action to build up hydraulic pressure for the purpose of sealing the ring in the piston groove and against the cylinder wall.

A further object of the invention is to provide, in a manner as hereinafter set forth, a sectional piston ring having a check valve action and so constructed and arranged to form a trap for oil, which is pumped in by check valve action, resulting in a reservoir of oil for wall lubrication, for cutting down the excessive tension points thereby eliminating the entire tension of ring, which permits of a deeper ring to be employed, and further for breaking up the opposed abutting surfaces of the sections of the ring.

A further object of the invention is to provide, in a manner as hereinafter set forth, a sectional piston ring having a machined turned leading face, a follower face and outer edge resulting, when the ring is used, in a quick and more efficient seating.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a cross sectional view of a piston and cylinder showing the adaptation therewith of a sectional piston ring in accordance with this invention and further illustrating an expander for the ring.

Figure 2 is a fragmentary view in vertical section illustrating the adaptation therewith of a sectional piston ring in accordance with this invention.

Figure 3 is a top plan view of one of the sections of the ring.

Figure 4 is a fragmentary view in vertical section illustrating the check valve action of the ring on the rear stroke of the piston.

Figure 5 is a view similar to Figure 4 illustrating the check valve action of the ring on the forward stroke of the piston.

Figure 6 is a fragmentary view in vertical section illustrating the piston groove filled with oil and the sections of the ring separated by the oil.

Figure 7 is a view similar to Figure 6 illustrating a modified form of ring.

Figure 8 is a fragmentary view in perspective upon an enlarged scale illustrating the body of a ring section.

The ring comprises a pair of split, opposed, annular sections referred to generally at 1, 2. The section 1 is the leading section and section 2 the follower section. The outer side 3 of section 1 is the leading face of the ring and the outer side 4 of section 2 the follower face of the ring. The leading face of the ring opposes the leading wall of the piston groove and the follower face of the ring opposes the follower wall of such groove, or in other words the follower face opposes the rear wall of the piston groove and the leading face opposes the forward wall of the piston groove. The leading and follower faces of the ring seat against the forward and rear walls respectively of the piston groove.

The inner sides of sections 1, 2 are indicated at 5, 6 respectively. The outer edges of sections 1, 2 are indicated at 7, 8 respectively and provide the outer edge of the ring which rides against the cylinder wall. The inner edges of sections 1, 2 are indicated at 9, 10 and which oppose the inner wall of piston groove. The combined thickness of the two sections of the ring is less than the width and depth of the piston groove.

The piston is indicated at 10', its peripheral groove at 11, the forward wall of the groove at 12, the rear wall of the groove at 13 and the inner wall of the groove at 14. The cylinder is indicated at 14' and that face thereof against which rides the piston ring is indicated at 15.

The section 1 at its inner side 5 is provided with spaced, transversely extending grooves 16 which gradually increase in depth from the outer towards the inner edge of said section. The inner face of section 2 is provided with spaced, transversely extending grooves 17 which gradually increase in depth from the outer towards the inner edge of section 2.

The sections 1 and 2 may be so formed that the groove 16 of section 1 will align with groove 17 of section 2, but such grooves if desired may be so set up whereby the grooves in one section will partly overlap the grooves in the other section or the grooves of one section will be staggered with respect to the grooves of the other section.

The outer side of each section is slightly roughened as such side is turned or machined and the outer edge of each section is formed in the same manner as the outer side thereof. The inner side of each section and inner edge of such section are ground and smooth. Referring to Figure 8 the roughened, machined or turned outer side of section 1, as well as the outer edge of such section is shown and section 2 will be constructed in the same manner as section 1. The slight irregular surface of the outer edges and outer sides of the sections will provide for a quick and accurate seating thereof with respect to the cylinder wall and forward and rear walls of the piston grooves.

The method of producing a piston ring, in accordance with this invention, consists in machining or turning the outer side and outer edge of one of the sections of the ring to provide slightly roughened surfaces, then grinding the inner side of said section to provide the latter half the size of the ring to be completed. The other section of the ring is then machined or turned on its outer side and outer edge to provide slightly roughened surfaces, after which said section is ground on its inner side to provide the section half the size of the ring to be completed. The inner sides of said sections are positioned against each other which completes the ring and the latter will have its leading and follower faces and its outer edge slightly roughened which, when the ring is used, will provide for a quick and accurate seating thereof. The inner sides of said sections are transversely grooved after the grinding operation. The ring body is of a thickness less than the width and depth of the piston groove.

The ring when employed as a check valve action to provide in connection with the walls of the piston grooves a trap or reservoir for oil and on the rearward or down stroke of the piston the ring functions as a check valve, in that the leading section of the ring abuts against the forward wall of the groove and prevents the passing of the oil forwardly of the groove. The sections of the ring when the piston moves downwardly coacts with the walls of the piston groove, to provide the reservoir and with the discharge for the latter being rearwardly of the rear section of the ring. When the piston moves forwardly the rear section of the ring sets up a check valve action as it engages the rear wall of the groove and extends upwardly from the latter and the sections of the ring in connection with the walls of the groove provide an oil reservoir and with the discharge being forwardly of the forward section of the ring.

The grooves provide ports and the ports act to provide traps for the oil pumped in by the check valve action. The pressure created by the check valve action fills the traps and groove with oil, which spreads two pieces of the ring against the groove wall and out against the cylinder wall, or in other words, the hydraulic force spreads the ring in the groove. The ports further provide to allow some of the oil from center of the ring to get back to the cylinder wall at a point in the center of the face of the ring. This makes a solid ring of oil against the cylinder wall, just at the point where the oil is needed. This fact makes the ring a lubricating ring, so there is no chance of getting too much tension in the ring or expander, for there can be no cylinder wall wear if there is no friction, and there can be no friction because the ring is lubricated from the inside of ring, through the ports. As this oil pressure dies down, the check valve action builds it back up.

Arranged within the groove 11 and interposed between the ring and wall 14 is an expander 18 of polygonal contour.

When the ring is compressed and positioned around the piston, the tension against the cylinder wall is not uniform. The arrows in Figure 1 show where the points of excessive tension are. The ports provided by the grooves of the ring section are placed between the points of excessive tension, thus weakening the ring at the right place to lessen the excessive tension at these points, or in other words, decreasing the tensional strength of the ring at the points of excessive tension, thereby making the tensial pressure against the cylinder wall more uniform. A further advantage is obtained by providing the ring sections with the grooves, as a deeper ring can be used and still be as flexible as a more shallow ring without ports. The depth and shallow reference is to the distance indicated at X in Figure 3. The advantage of a deep ring is to keep the ring from rocking in the groove, and a deep ring will have a longer life. Another advantage of the ports is to break up surfaces to eliminate any chance of the two sections of the ring sticking together instead of sticking to their respective groove walls.

Figure 7 discloses a modified form of ring and the sections thereof are indicated at 19, 20 and are constructed in the same manner as the sections 1 and 2, with this exception that section 19 is provided with an outer beveled corner 21. Otherwise than that as stated the form shown in Figure 7 is the same as that shown in Figures 3 to 6 inclusive.

It is thought the many advantages of a piston ring, in accordance with this invention can be readily understood, and although the preferred embodiment of the invention is as illustrated and described, yet it is to be understood that changes in the details of construction can be had which fall within the scope of the invention as claimed.

What I claim is:

1. A method of manufacturing a two part resilient, split piston ring consisting in slightly roughening throughout the outer side of each part, forming spaced, transverse grooves on the inner side of each part, then reducing the thickness of each part from its inner side to half the thickness of the ring when completed, and then positioning the inner sides of said parts in opposed relation to complete the ring.

2. A method of manufacturing a two part, resilient, split piston ring consisting in slightly roughening throughout the outer side and outer edge of each part, forming spaced, transverse grooves on the inner side of each part, then reducing the thickness of each part from its inner side to half the thickness of the ring when completed, and then positioning the inner sides of said parts in opposed relation with their outer edges flush to complete the ring.

In testimony whereof, I affix my signature hereto.

EDWARD J. BUDLONG.